United States Patent [19]

Niki et al.

[11] Patent Number: 5,656,691
[45] Date of Patent: Aug. 12, 1997

[54] REFORMED POLYPROPYLENE RESIN COMPOSITION AND A METHOD OF PREPARING THE SAME

[75] Inventors: Yasuhiro Niki; Toshio Kobayashi; Takashi Arai, all of Ichihara, Japan

[73] Assignee: Mitsui Petrochemical Industries, Ltd., Tokyo, Japan

[21] Appl. No.: 403,627

[22] Filed: Mar. 14, 1995

[30] Foreign Application Priority Data

Mar. 15, 1994 [JP] Japan ................... 6-044321

[51] Int. Cl.$^6$ ............... C08L 23/26; C08L 23/30; C08L 23/32

[52] U.S. Cl. ............ 525/53; 525/88; 525/193; 525/197; 525/941; 524/505; 524/528

[58] Field of Search ............... 525/193, 88, 941, 525/53, 197; 524/505, 528

[56] References Cited

U.S. PATENT DOCUMENTS

| Re. 31,518 | 2/1984 | Fischer | 525/197 |
| 3,256,366 | 6/1966 | Corbelli | 260/897 |
| 4,088,714 | 5/1978 | Huff | 260/897 |
| 4,202,801 | 5/1980 | Petersen | 260/5 |
| 4,454,092 | 6/1984 | Shimizu et al. | 525/197 |

FOREIGN PATENT DOCUMENTS

0153415  9/1985  European Pat. Off. .

OTHER PUBLICATIONS

Advances in Polymer Technology, vol. 12, No. 3, 1993 New York US, pp. 263–269, B.K. Kim et al. 'cross–linking of polypropylene by peroxide and multifunctional monomer during reactive extrusion'.

*Primary Examiner*—D. R. Wilson
*Attorney, Agent, or Firm*—Sherman and Shalloway

[57] ABSTRACT

A reformed polypropylene resin composition having high degree of fluidity and excellent impact strength and rigidity, and further having a melt flow rate of from 50 to 150 g/10 min. and establishing a relationship between the melt flow rate (X) and the Izod impact strength (Y) which satisfies a relation $Y \geq -4.7878 \log X + 13.8829$. The reformed polypropylene resin composition is obtained by blending 0.01 to 0.2 parts by weight of an organic peroxide and 0.05 to 1 part by weight of a crosslinking agent per 100 parts by weight of a total of 50 to 90 parts by weight of a polypropylene having a melt flow rate at 230° C. of 10 to 70 g/10 min, 0 to 25 parts by weight of an olefin copolymer rubber, and 5 to 40 parts by weight of an organic filler, and by melt-kneading the mixture by using a biaxial extruder maintaining a temperature of 120° to 200° in the preceding stage of the screw and a temperature of 180° to 270° C. in the succeeding stage, and setting the temperature in the succeeding stage to be higher than the temperature in the preceding stage.

13 Claims, 1 Drawing Sheet

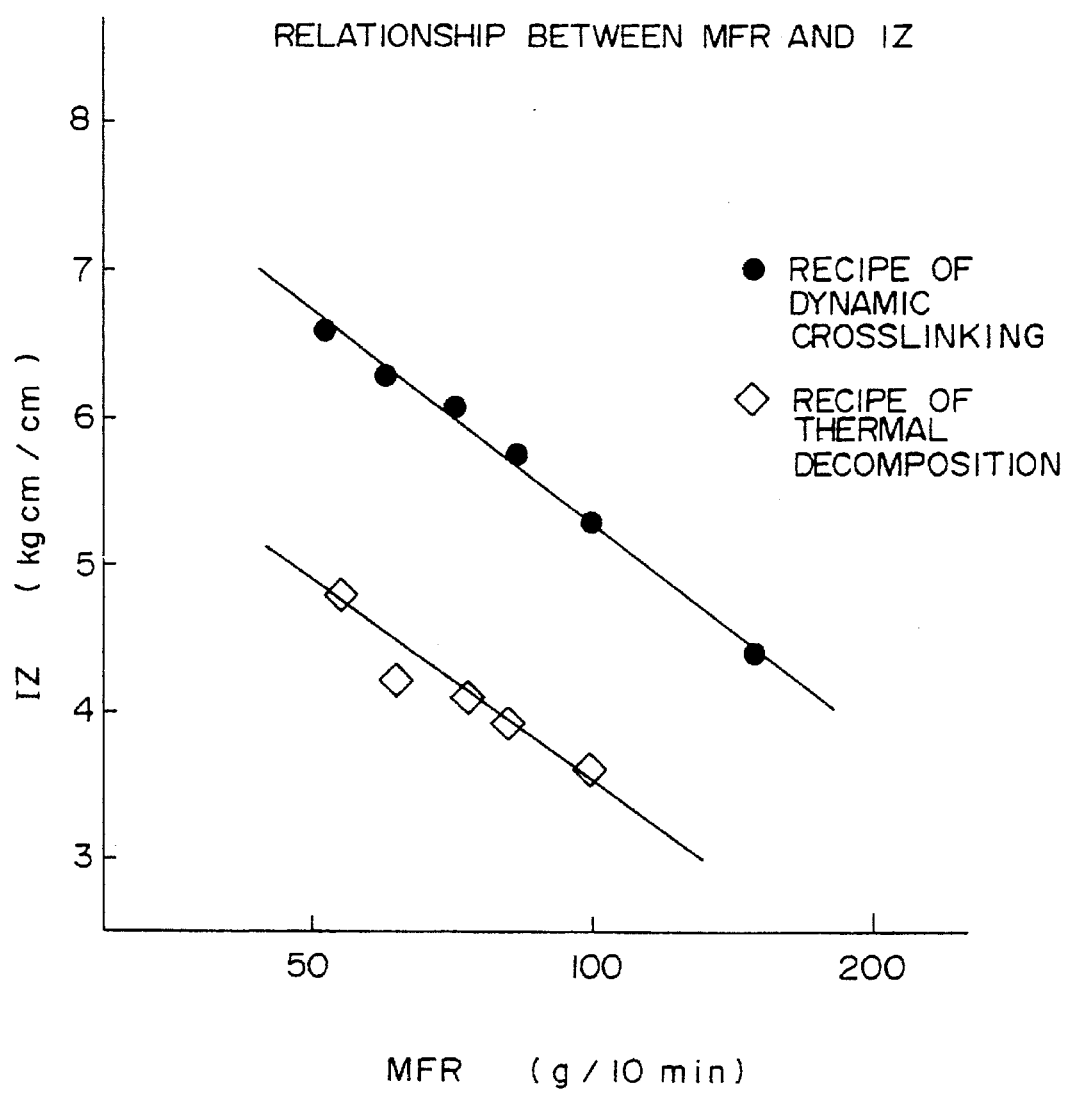

REFORMED POLYPROPYLENE RESIN COMPOSITION AND A METHOD OF PREPARING THE SAME

BACKGROUND OF THE INVENTION

1. Field of the Invention

The present invention relates to a reformed polypropylene resin composition, a method of producing the same, a mold-stamping material composed of the reformed resin composition, and injection-molded articles thereof. More specifically, the invention relates a reformed polypropylene resin composition having high fluidity, excellent impact strength and rigidity, a method of producing the same, a mold-stamping material composed of the reformed resin composition and injection-molded articles thereof.

2. Description of the Prior Art

In the field of automotive parts, it is becoming essential to reduce the weight to cope with environmental problems on a global scale. In particular, the base resins for producing thin and light-weight products by such a molding method as mold-stamping or the like, must have high degree of fluidity, high degree of rigidity and excellent impact strength property.

To meet such requirements, a lot of improvements have been accomplished and a variety of polyolefin resin compositions have been developed. For instance, a polyolefin resin composition having improved fluidity is obtained by heat-treating a polyolefin resin while adding an organic peroxide thereto. However, the thus obtained polyolefin resin has problems in that it has small rigidity and low impact strength property.

Japanese Laid-Open Patent Publication Nos. 42448/1985 and 233047/1986 disclose polypropylene resin compositions having high degree of fluidity, excellent rigidity and impact strength property at low temperatures that are obtained by blending a crystalline ethylene/propylene block copolymer with an ethylene/propylene copolymer rubber, an inorganic filler and an organic peroxide, and heat-treating them at 170° to 280° C.

When the polypropylene resin composition is processed as described above, however, the crystalline ethylene/propylene block copolymer undergoes the decomposition. Therefore, though the fluidity increases, the rigidity and the impact strength property are not sufficiently improved.

SUMMARY OF THE INVENTION

In order to solve the above-mentioned problems, the object of the present invention is to provide a reformed polypropylene resin composition having high degree of fluidity and excellent rigidity and impact strength property, as well as a method of producing the same.

Another object of the present invention is to provide a mold-stamping material which can be easily molded by the mold-stamping method making it possible to obtain molded articles having a reduced thickness yet maintaining excellent strength.

A further object of the present invention is to provide injection-molded articles molded by the injection-molding method and having a reduced thickness yet maintaining excellent strength.

According to the present invention, there is provided a reformed polypropylene resin composition obtained by heat-treating a polypropylene resin composition in which are blended (D) 0.01 to 0.2 parts by weight of an organic peroxide, and (E) 0.05 to 1 part by weight of a crosslinking assistant, per 100 parts by weight of a total of (A) 50 to 90 parts by weight of a polypropylene having a melt flow rate of from 10 to 70 g/10 min. at 230° C., (B) 0 to 25 parts by weight of an olefin copolymer rubber, and (C) 5 to 40 parts by weight of an inorganic filler, the reformed polypropylene resin composition exhibiting a melt flow rate at 230° C. of from 50 to 150 g/10 min., and establishing a relationship between the melt flow rate (X) and the Izod impact strength (Y) that lies within a range satisfying the following formula (1), $$Y \geq -4.7878 \log X + 13.8829 \tag{1}$$

and, more preferably, satisfying the following formulas (2) and (3), $$Y \geq -4.7878 \log X + 14.3329 \tag{2}$$

$$Y \leq -4.7878 \log X + 16.8829 \tag{3}.$$

According to the present invention, furthermore, there is provided a method of producing a reformed polypropylene resin composition comprising melt-kneading a polypropylene resin composition in which are blended (D) 0.01 to 0.2 parts by weight of an organic peroxide, and (E) 0.05 to 1 part by weight of a crosslinking assistant, per 100 parts by weight of a total of (A) 50 to 90 parts by weight of a polypropylene having a melt flow rate of from 10 to 70 g/10 min. at 230° C., (B) 0 to 25 parts by weight of an olefin copolymer rubber, and (C) 5 to 40 parts by weight of an inorganic filler, by using a biaxial extruder maintaining a temperature of from 120° to 200° C. and, particularly, from 140° to 160° C. in the preceding stage of the screw and maintaining a temperature of from 180° to 280° C. and, particularly, from 200° to 260° C. in the succeeding stage of the screw, and setting the temperature in the succeeding stage to be higher than that of the preceding stage.

According to the present invention, there is further provided a mold-stamping material comprising the above-mentioned reformed polypropylene resin composition.

According to the present invention, there is further provided injection-molded articles obtained by injection-molding the above-mentioned reformed polypropylene resin composition.

BRIEF DESCRIPTION OF THE DRAWING

The accompanying drawing is a graph plotting relationships between the melt flow rate and the Izod impact strength using reformed polypropylene resin compositions of the present invention and polypropylene compositions of Comparative Examples that will be mentioned later.

DETAILED DESCRIPTION OF THE PREFERRED EMBODIMENTS

In the present invention, the melt flow rate (MFR) is measured in compliance with ASTM D 1238 (230° C. under a load of 2160 g). The Izod impact strength is measured with notch in compliance with ASTM D-628.

According to the present invention, a reformed polypropylene resin composition is obtained by heat-treating a composition comprising a polypropylene, an olefin copolymer rubber and an inorganic filler in the presence of an organic peroxide and a crosslinking assistant, and has a distinguished feature in that the Izod impact strength is conspicuously improved when compared on the basis of the same melt flow rate. Besides, a great technical meaning resides in that this advantage is accomplished with a composition which contains a polypropylene as a major component.

In the olefin elastomers, in general, the melt flow rate and the Izod impact strength establish such a relationship that the Izod impact strength increases with a decrease in the melt flow rate. As for a predetermined starting resin, the logarithmic value of the melt flow rate and the impact strength establish a linear relationship of a negative gradient as shown in the accompanying drawing.

Therefore, if it is attempted to increase the impact strength of the elastomer, the melt flow rate of the elastomer is forced to assume a small value, whereby the fluidity and machinability of the elastomer are impaired making it difficult to accomplish both high impact strength and melt fluidity.

According to the present invention, the relationship between the impact strength and the melt flow rate is established at a level which is quite different from that of the conventional elastomer, i.e., the impact strength is maintained at a high level as compared based on the same melt flow rate and, thus, a large impact strength and an excellent melt fluidity are both accomplished. It is further allowed to improve mechanical properties such as modulus of elasticity and elongation. Besides, use is made of chiefly a polypropylene that is cheaply and easily available without using an expensive olefin copolymer rubber or using an expensive olefin copolymer rubber in only a small amount, making it possible to decrease the cost of manufacturing the elastomer.

In preparing the reformed polypropylene resin composition of the present invention, it is important to use a particular amount of an organic peroxide and a particular amount of a crosslinking assistant in combination from the standpoint of improving the impact strength.

In preparing the reformed polypropylene resin composition, furthermore, it is important that the melt-kneading in the preceding stage is effected at a relatively low temperature and the melt-kneading in the succeeding stage is effected at a relatively high temperature, and whereby a relatively low melt flow rate and a relatively large impact strength are imparted in combination. The reason is attributed to that by effecting the melt-kneading in the preceding stage at a low temperature, olefin copolymer rubber is finely dispersed in the polypropylene phase and by effecting the heat-treatment in the succeeding stage at a high temperature, the molecular weight of the polypropylene is lowered and the crosslinking takes place between the polypropylene and the olefin copolymer rubber, though this is not to impose any limitation on the present invention.

In the starting composition used in the present invention, it is particularly desired to blend 0.02 to 0.1 parts by weight of an organic peroxide (D) and 0.1 to 0.6 parts by weight of a crosslinking assistant (E) per 100 parts by weight of a total of 60 to 80 parts by weight of a polypropylene (A), 5 to 15 parts by weight of an olefin copolymer rubber (B) and 10 to 30 parts by weight of an inorganic filler (C).

The polypropylene (A) used in the present invention has an MFR of 10 to 70 g/10 min. and, preferably, 20 to 60 g/10 min. at 230° C. Though there is no particular limitation on the kind of the polypropylene, excellent rigidity is obtained if use is made of a propylene homopolymer or a propylene/ethylene block copolymer having an ethylene content of up to 20 mol %.

The olefin copolymer rubber (B) used in the present invention is an amorphous and random elastic copolymer consisting of olefin as a major component, and develops crosslinking upon heating and kneading on being mixed with an organic peroxide.

Examples of the olefin copolymer rubber (B) include olefin copolymer rubbers without containing diene component, such as ethylene/propylene copolymer rubber, ethylene/butene-1 copolymer rubber and propylene/ethylene copolymer rubber; ethylene/propylene nonconjugated diene copolymer rubbers such as ethylene/propylene/cyclopentadiene copolymer rubber, ethylene/propylene/1,4-hexadiene copolymer rubber, ethylene/propylene/cyclooctadiene copolymer rubber, ethylene/propylene/methylenenorbornene copolymer rubber, ethylene/propylene/ethylidenenorbornene copolymer rubber; and ethylene/butadiene copolymer rubber. They may be used in a single kind or may be used in two or more kinds in a suitable combination.

Among the above-mentioned olefin copolymer rubbers (B), excellent impact strength is obtained when use is made of the ethylene/propylene/nonconjugated diene copolymer rubber or the propylene/ethylene copolymer rubber.

Examples of the inorganic filler (C) used in the present invention include talc, silica, mica, calcium carbonate, glass fiber, glass beads, barium sulfate, magnesium hydroxide, wollastonite, calcium silicate fiber, carbon fiber, magnesium oxalate fiber, potassium titanate fiber, titanium oxide, calcium sulfite, white carbon, clay, and calcium sulfate. They may be used in a single kind or may be used in two or more kinds in a suitable combination.

Among the above-mentioned inorganic fillers (C), it is desired to use the talc since it gives increased rigidity and impact strength. In particular, it is desired to use the talk having an average particle size of from 0.1 to 3.0 μm and, particularly, from 0.5 to 2.5 μm as it gives markedly increased rigidity and impact strength.

The organic peroxide (D) used in the present invention should have a decomposition temperature of from 150° to 270° C. and, preferably, from 170° to 190° C. to render the half-life to be one minute. Examples include benzoyl peroxide, dichlorobenzoyl peroxide, dicumyl peroxide, di-t-butyl peroxide, 2,5-dimethyl-2,5-di(peroxide benzoate) hexyne-3,1,3-bis(t-butyl peroxyisopropyl)benzene, lauroyl peroxide, t-butyl peracetate, 2,5-dimethyl-2,5-di(t-butyl peroxy)hexyne-3, t-butyl perbenzoate, t-butyl perphenyl acetate, t-butyl perisobutylate, t-butyl per-sec-octate, t-butyl perpivalate, cumyl perpivalate, t-butyl perdiethyl acetate, and the like.

Among them, it is desired to use 1,3-bis(t-butyl peroxyisopropyl)benzene, dicumyl peroxide, di-t-butyl peroxide, 2,5-dimethyl-2,5-di(t-butyl peroxide)hexyne-3, and the like since they improve fluidity to a conspicuous degree.

The crosslinking assistant (E) used in the present invention effects the crosslinking upon the reaction with the polypropylene (A) and the organic peroxide (D) and with the olefin copolymer rubber (B) that is cut or activated by the organic peroxide. Examples of the crosslinking agent (E) include sulfur; divinyl compound such as divinyl benzene; diallyl compound such as diallyl phthalate; oxime compounds such as p-quinone dioxime, p,p'-dibenzoylquinone dioxime; maleimide compound such as phenyl maleimide, and triallyl cyanulate, triallyl isocyanurate, ethylene glycol methacrylate, polyethylene glycol methacrylate, 1,3-5-triacryloylhexahydro-s-triazine, oligomer having double bond on a main chain or on a side chain such as liquid 1.2-polybutadiene, and polymer having double bond on a main chain or a side chain such as syndiotactic-1,2-polybutadiene and the like.

Among them, it is desired to use divinyl compound, maleimide compound, quinone dioxime compound and, particularly, divinyl benzene since they help the above-mentioned properties balanced.

The most excellent effects are obtained when the desired compounds selected out of the above-mentioned components (A) to (E) are used in combination. However, excellent effects are obtained within a predetermined range even when desired components are selected out of predetermined compounds and are blended with other components of wide ranges.

The present invention uses the components at the following ratios, i.e., the polypropylene (A) in an amount of 50 to 90 parts by weight and, preferably, 60 to 80 parts by weight, the olefin copolymer rubber (B) in an amount of 0 to 25 parts by weight and, preferably, 5 to 15 parts by weight, and the inorganic filler (C) in an amount of 5 to 40 parts by weight, and preferably, 10 to 30 parts by weight. There are further used the organic peroxide (D) in an amount of 0.01 to 0.2 parts by weight and, preferably, 0.02 to 0.1 parts by weight, and the crosslinking assistant (E) in an amount of 0.05 to 1 parts by weight and, preferably, 0.1 to 0.6 parts by weight per 100 parts by weight of the total of the above-mentioned components (A) to (C).

When blended in preferred ranges, the above-mentioned components (A) to (E) help reform the resin composition to a maximum degree and help improve fluidity, rigidity and impact strength of the resulting reformed polypropylene resin composition to a great degree. Moreover, excellent effects are obtained within a predetermined range even when predetermined components only are used in preferred ranges and are then blended with other components of wide ranges.

The reformed polypropylene resin composition of the present invention may contain other components such as coloring agent, heat stabilizer, anti-aging agent, and the like components.

The reformed polypropylene resin composition of the present invention is obtained by heat-treating the composition that contains the above-mentioned components, and exhibits the MFR over a range of 50 to 150 g/10 min. and preferably, 70 to 120 g/10 min. at 230° C. and establishes a relationship between the Izod impact strength and the MFR satisfying the above-mentioned formula (1) and, particularly, the above-mentioned formulas (2) and (3). The reforming effect is obtained provided the MFR is from 50 to 150 g/10 min. and further improved reforming effect is obtained provided the MFR is from 70 to 120 g/10 min. at 230° C.

The heat-treatment is carried out by melt-kneading the polypropylene resin composition by using a biaxial extruder maintaining a temperature of 120° to 200° C. and, preferably, 140° to 160° C. in the preceding stage of the screw i.e. a first stage, and a temperature of 180° to 270° C. and, preferably 200° to 260° C. in the succeeding stage, i.e. a second stage, and setting the temperature in the succeeding stage to be higher than the temperature in the preceding stage.

According to the method of the present invention, the polypropylene resin composition containing the above-mentioned components (A) to (E) and, as required, other components is reformed by being melt-kneaded using the biaxial extruder maintaining a temperature of 120° to 200° C. and, preferably, 140° to 160° C. in the preceding stage of the screw and a temperature of 180° to 270° C. and, preferably 200° to 260° C. in the succeeding stage, and setting the temperature in the succeeding stage to be higher than the temperature in the preceding stage. In this case, the melt-kneading is so effected that the polypropylene resin composition after reformed exhibits the MFR of 50 to 150 g/10 min. and, preferably, 70 to 120 g/10 min. at 230° C. and establishes a relationship between the Izod impact strength and the MFR that satisfies the above-mentioned formula (1) and, particularly, the above-mentioned formulas (2) and (3).

When the temperature in the preceding stage of the screw is not higher than 120° C., the resin is not melted sufficiently and when the temperature exceeds 200° C., the polypropylene (A), the olefin copolymer rubber (B) and the inorganic filler (C) are not kneaded to a sufficient degree. When the temperature in the succeeding stage of the screw is not higher than 180° C., the organic peroxide does not completely dissolve and when the temperature exceeds 270° C., the decomposition reaction takes place preferentially to impair the properties. By setting the above-mentioned temperature conditions, the above-mentioned inconvenience is avoided and a reformed polyolefin resin composition is obtained having high degree of fluidity and excellent rigidity and impact strength. By melt-kneading the polypropylene resin composition under the above-mentioned desired temperature conditions, it is allowed to obtain a reformed polypropylene resin composition which exhibits more stable and reformed properties.

It is desired that the components have been dry-blended in advance before being melt-kneaded by using the biaxial extruder. The resin composition of before being reformed exhibits the MFR of 3 to 70 g/10 min. and, preferably, 8 to 60 g/10 min. at 230° C. Furthermore, the specific energy of the biaxial extruder is from 0.1 to 0.5 kWh/kg and, preferably, from 0.1 to 0.3 kWh/kg.

Being thus reformed, the polypropylene resin composition exhibits improved fluidity and rigidity without losing impact strength. There is thus obtained the reformed polypropylene resin composition having high degree of fluidity and excellent rigidity and impact strength. Though the reason is not obvious, it is presumed that by effecting the melt-kneading in the preceding stage at a temperature of 120° to 200° C., the olefin copolymer rubber (B) is finely dispersed in the polypropylene phase (A) and by effecting the heat-treatment in the succeeding stage at 180° to 270° C., the molecular weight of the polypropylene (A) is lowered and the crosslinking takes place between the polypropylene (A) and the olefin copolymer rubber(B).

The reformed polypropylene resin composition of the present invention has a high degree of fluidity as well as excellent rigidity and impact strength, and is suited for use as a material for being mold-stamped by the mold-stamping method in the applications where it is required to reduce the thickness and weight. Concretely speaking, the examples include automotive parts such as door trims, instrument panels, rear packages, seat-back garnish, etc. Furthermore, the molded articles can be easily obtained by the molding method such as injection-molding.

According to the present invention, the mold-stamping material is composed of the reformed polypropylene resin composition and serves as a base material for being molded by the mold-stamping method. The reformed polypropylene resin composition of the present invention has a high degree of fluidity and can be used as a material for being mold-stamped in the fields where it is required to reduce the thickness and weight. Such a material can be used as a base material for being mold-stamped, and makes it possible to obtain final products having reduced thickness, excellent rigidity and excellent impact strength. Concrete examples of the molded articles are automotive parts as described above.

The injection-molded articles of the present invention are obtained by injection-molding the reformed polypropylene resin composition of the present invention. Because of its high degree of fluidity, the reformed polypropylene resin composition of the present invention can be charged up to fine portions of the injection mold. Therefore, the injection-molded articles thus obtained exhibit excellent rigidity and impact strength despite of their reduced thicknesses.

The reformed polypropylene resin composition of the present invention is obtained by heat-treating a particular polypropylene resin composition, exhibits high degree of fluidity, excellent rigidity and impact strength, and makes it possible to obtain molded articles having reduced thickness and reduced weight.

According to the preparation method of the present invention, a particular polypropylene resin composition is blended with an organic peroxide and a crosslinking agent, and the mixture is melt-kneaded using a biaxial extruder under particular temperature conditions. It is therefore allowed to easily and efficiently produce the reformed polyolefin resin composition having high degree of fluidity and excellent rigidity and impact strength.

The mold-stamping material of the present invention comprises the above-mentioned reformed polypropylene resin composition and can be molded by the mold-stamping method to obtain molded articles having reduced thickness, reduced weight and excellent strength.

The injection-molded articles of the present invention comprise the above-mentioned reformed polypropylene resin composition, and have reduced thickness, reduced weight, excellent rigidity and excellent impact strength.

EXAMPLES

Examples of the present invention will now be described below.

Examples 1 to 5 and Comparative Examples 1 to 4

70 Parts by weight of a homopolypropylene (MFR=50 g/10 min.) as a polypropylene, 15 parts by weight of a propylene/ethylene copolymer rubber (MFR=0.5 g/10 min.) as an olefin copolymer rubber, and 15 parts by weight of a talc as an inorganic filler were mixed together. Moreover, a 2,5-dimethyl-2,5-di(t-butyl peroxy)hexyne-3 was used as an organic peroxide, a divinyl benzene was used as a crosslinking assistant, and the reformed polypropylene resin composition was prepared in a manner as described below.

The organic peroxide and the crosslinking assistant were dry-blended in amounts as shown in Table 1 with respect to 100 parts by weight of a total of the homopolypropylene, the olefin copolymer rubber and the inorganic filler. By using a biaxial extruder (TEM manufactured by Toshiba Co., cylinder diameter=53 mm, L/D=45, number of revolutions of the screw=250 rpm, specific energy=0.16 to 0.25 kWh/kg, amount of extrusion=45 kg/hr), the mixture was melt-kneaded under the conditions of temperatures (140° C., 140° C., 140° C. at three places) in the preceding stage of the cylinder and temperatures (240° C., 240° C., 200° C., 200° C. at four places) in the succeeding stage thereby to obtain pellets. Test pieces were prepared from the pellets and were evaluated. The results were as shown in Table 1. The method of evaluation was as follows:

1) MFR: Measured in compliance with ASTM D 1238 (at a temperature of 230° C. under a load of 2160 g).

2) Tensile elongation: In compliance with ASTM D-638.

3) Initial flexural modulus of elasticity: In compliance with ASTM D-790.

4) Izod impact strength (with notch): In compliance with ASTM D-628.

Example 6

80 Parts by weight of a homopolypropylene (MFR=10 g/10 min.), 5 parts by weight of a propylene/ethylene copolymer rubber (MFR=0.5 g/10 min), 15 parts by weight of a talc, 0.08 parts by weight of a 2,5-dimethyl-2,5-di(t-butyl peroxy)hexyne-3, and 0.20 parts by weight of a divinyl benzene were mixed and melt-kneaded under the same conditions as in Example 1 to obtain pellets. A test piece was prepared from the pellets and was evaluated in the same manner as in Example 1. The results were as shown in Table 1. The density of the obtained reformed polypropylene resin composition was 1.0 g/cm$^3$.

Example 7

70 Parts by weight of a propylene/ethylene block copolymer (MFR=55 g/10 min.), 15 parts by weight of an ethylene/propylene/diene copolymer rubber (ethylene content=78 mol %, Mooney viscosity $ML_{1+4}$ (121° C.)=64, iodine value=7), 0.08 parts by weight of a 2,5-dimethyl-2,5-di(t-butyl peroxy)hexyne-3, and 0.20 parts by weight of a divinyl benzene were mixed and melt-kneaded under the same conditions as in Example 1 to obtain pellets. A test piece was prepared from the pellets and was evaluated in the same manner as in Example 1. The results were as shown in Table 1.

Example 8

The procedure of Example 1 was repeated but using 0.50 parts by weight of a triallyl isocyanurate instead of using the divinyl benzene used in Example 1. The results were as shown in Table 1.

TABLE 1

| | Organic peroxide (parts by weight) | Crosslinking assistant (parts by weight) | MFR of composition *1 Before reformed | MFR of composition *1 After reformed | Tensile elongation (%) | Initial flexural modulus of elasticity (kg/cm$^2$) | Izod impact strength *2 |
|---|---|---|---|---|---|---|---|
| Example 1 | 0.08 | 0.50 | 22 | 52 | 30 | 24100 | 6.6 |
| Example 2 | 0.08 | 0.375 | 22 | 60 | 30 | 24100 | 6.3 |

TABLE 1-continued

|  | Organic peroxide (parts by weight) | Crosslinking assistant (parts by weight) | MFR of composition *1 Before reformed | MFR of composition *1 After reformed | Tensile elongation (%) | Initial flexural modulus of elasticity (kg/cm²) | Izod impact strength *2 |
|---|---|---|---|---|---|---|---|
| Example 3 | 0.08 | 0.30 | 22 | 72 | 30 | 24000 | 6.1 |
| Example 4 | 0.08 | 0.25 | 22 | 83 | 25 | 24300 | 5.8 |
| Example 5 | 0.08 | 0.20 | 22 | 100 | 20 | 24000 | 5.3 |
| Example 6 | 0.08 | 0.20 | 7 | 70 | 35 | 23300 | 7.1 |
| Example 7 | 0.08 | 0.20 | 20 | 65 | 40 | 23800 | 7.5 |
| Example 8 | 0.08 | 0.50 | 22 | 62 | 25 | 23900 | 6.3 |
| Comp. Exam. 1 | 0.005 | 0 | 22 | 54 | 25 | 22900 | 4.8 |
| Comp. Exam. 2 | 0.02 | 0 | 22 | 62 | 20 | 22900 | 4.2 |
| Comp. Exam. 3 | 0.03 | 0 | 22 | 73 | 20 | 22500 | 4.1 |
| Comp. Exam. 4 | 0.04 | 0 | 22 | 81 | 20 | 22100 | 3.9 |

*1 Unit: g/10 min.
*2 Unit: kg · cm/cm

It will be understood from Table 1 that the test pieces of Examples all exhibit high tensile elongations, high initial flexural moduli of elasticity and large Izod impact strengths even though the total MFR is from 50 to 100 g/10 min. It will thus be understood that there are obtained reformed polypropylene resin compositions having strikingly improved rigidity without losing tensile elongation or impact strength despite of their high degree of fluidity.

We claim:

1. A reformed polypropylene resin composition which is obtained by blending
   (A) 60 to 90 parts by weight of polypropylene having a melt flow rate of from 10 to 70 g/10 minutes at 230° C.,
   (B) 5 to 15 parts by weight of an olefin copolymer rubber,
   (C) 5 to 40 parts by weight of an inorganic filler, the sum of the amounts of the components (A), (B) and (C) being 100 parts by weight, and
   (D) 0.01 to 0.2 part by weight of an organic peroxide per 100 parts by weight of the sum of the amounts of (A), (B) and (C), and
   (E) 0.05 to 1 part by weight of a crosslinking assistant, per 100 parts by weight of the sum amounts of (A), (B) and (C),
   melt-kneading the blend by using a biaxial screw extruder maintaining a temperature of from 140° to 160° C. in the first stage of the screw and maintaining a temperature of from 200° C. to 260° C. in the second stage of the screw;
   wherein the reformed polypropylene resin composition exhibits a melt flow rate at 230° C. of from 50 to 150 g/10 minutes, and
   the relationship between the melt flow rate (X) and the Izod impact strength (Y, Kg.cm/cm) is within a range satisfying the following formula (1), $$Y \geq -4.7878 \log X + 13.8829 \tag{1}$$

2. A reformed polypropylene resin composition according to claim 1, wherein the relationship between the melt flow rate (X) and the Izod impact strength (Y) is within a range satisfying the following formulas, $$Y \geq -4.7878 \log X + 14.3329 \tag{2}$$

and $$Y \leq -4.7878 \log X + 16.8829 \tag{3}$$

3. A reformed polypropylene resin composition according to claim 1, wherein the organic peroxide (D) is in an amount of from 0.02 to 0.1 parts by weight and the crosslinking assistant (E) is in an amount of from 0.1 to 0.6 parts by weight per 100 parts by weight of a total of (A) 60 to 80 parts by weight of the polypropylene, (B) 5 to 15 parts by weight of the olefin copolymer rubber, and (C) 10 to 30 parts by weight of the inorganic filler.

4. A reformed polypropylene resin composition according to claim 1, wherein the polypropylene (A) is a propylene/ethylene block copolymer or a homopolypropylene, the olefin copolymer rubber (B) is an ethylene/propylene/diene copolymer rubber or a propylene/ethylene copolymer rubber, the inorganic filler (C) is a talc, and the cross-linking assistant (E) is a divinyl benzene.

5. A reformed polypropylene resin composition according to claim 1, wherein the reformed polypropylene resin composition has a melt flow rate of from 70 to 120 g/10 min.

6. A method of producing a reformed polypropylene resin composition which comprises melt-kneading a polypropylene resin composition comprising
   (D) 0.01 to 0.2 parts by weight of an organic peroxide, and
   (E) 0.05 to 1 part by weight of a crosslinking assistant, per 100 parts by weight of a total of
   (A) 50 to 90 parts by weight of a polypropylene having a melt flow rate of from 10 to 70 g/10 min. at 230° C.,
   (B) 5 to 25 parts by weight of an olefin copolymer rubber, and
   (C) 5 to 40 parts by weight of an inorganic filler, wherein the melt-kneading is carried out in a biaxial extruder, maintaining a temperature of from 120° to 200° C. in a first stage of the screw and maintaining a temperature of from 180° to 270° C. in a second stage of the screw, and setting the temperature in the second stage to be higher than that of the first stage
   wherein the reformed polypropylene resin composition exhibits a melt flow rate at 230° C. of from 50 to 150 g/10 minutes, and the relationship between the melt flow rate (X) and the Izod impact strength (Y, Kg.cm/cm) is within the range satisfying the following formula (1), $$Y \geq -4.7878 \log X + 13.8829 \tag{1}$$

7. A method according to claim 6, wherein the temperature in the first stage of the screw is from 140° to 160° C. and the temperature in the second stage is from 200° to 260° C.

8. A reformed polypropylene resin composition which is obtained by blending (A) 50 to 90 parts by weight of polypropylene having a melt flow rate of from 10 to 70 g/10 min. at 230° C., (B) 5 to 25 parts by weight of an olefin copolymer rubber, (C) 5 to 40 parts by weight of an inorganic filler, the sum of the amounts of the components (A), (B) and (C) being 100 parts by weight, and (D) 0.01 to 0.2 part by weight of an organic peroxide per 100 parts by weight of the sum of the amounts of (A), (B) and (C), and (E) 0.05 to 1 part by weight of a crosslinking assistant, per 100 parts by weight of the sum of the amounts of (A), (B) and (C), wherein the reformed polypropylene resin composition exhibits a melt flow rate at 230° C. of from 50 to 150 g/10 minutes, an Izod impact strength of 5.3 to 7.5, tensile elongation of 25 to 40% and an initial flexural modulus of elasticity of 23,300 to 24,300.

9. The reformed polypropylene resin composition of claim 8 obtained by a two-step heat treatment of the composition in a melt extruder, comprising melt kneading the composition in the melt extruder at a temperature of from 140° to 160° C. in a proceeding stage of the extruder and at a temperature of 200° to 260° C. in a succeeding stage of the extruder.

10. A reformed polypropylene resin composition according to claim 8, wherein the relationship between the melt flow rate (X) and the Izod impact strength (Y) is within a range satisfying the following formulas, $$Y \geq -4{,}7878 \log X + 14{,}3329 \qquad (2)$$

and $$Y \leq -4{,}7878 \log X + 16{,}8829 \qquad (3).$$

11. A reformed polypropylene resin composition according to claim 8, wherein the organic peroxide (D) is in an amount of from 0.02 to 0.1 parts by weight and the crosslinking assistant (E) is in an amount of from 0.1 to 0.6 parts by weight per 100 parts by weight of a total of from (A) 60 to 80 parts by weight of the polypropylene, (B) 5 to 15 parts by weight of the olefin copolymer rubber, and (C) 10 to 30 parts by weight of the inorganic filler.

12. A reformed polypropylene resin composition according to claim 8, wherein the polypropylene (A) is a propylene/ethylene block copolymer or a homopolypropylene, the olefin copolymer rubber (B) is an ethylene/propylene/diene copolymer rubber or a propylene/ethylene copolymer rubber, the inorganic filler (C) is a talc, and the cross-linking agent (E) is a divinyl benzene.

13. A reformed polypropylene resin composition according to claim 8, wherein the reformed polypropylene resin composition has a melt flow rate of from 70 to 120 g/10 min.

* * * * *